Patented Jan. 23, 1940

2,188,007

UNITED STATES PATENT OFFICE 2,188,007

INORGANIC AEROGEL COMPOSITIONS

Samuel S. Kistler, Worcester, Mass.

No Drawing. Application July 3, 1937,
Serial No. 151,969

5 Claims. (Cl. 252—6)

This invention relates to improvements in the art and process of producing dry gels from colloidal solutions, and the present specification is particularly directed to the production of a gel, one continuous phase of which is a gas, and which I therefore define as an aerogel.

This application is a continuation-in-part of my copending application, Serial Number 746,412, filed October 1, 1934, which in turn is a continuation of my application Serial Number 508,811, filed January 14, 1931.

Whenever a colloidal solution is precipitated, the product formed is usually defined as a gel. It is distinct from the precipitates from crystalloidal solutions by containing large quantities of the solvent in a soft "gelatinous" mass, usually microscopically heterogeneous and presenting some rigidity. Gels may be divided into two classes, the gelatinous precipitates and the jellies according to whether the product formed settles out in a flocculent mass or occupies the entire volume that the original solution occupied, and appears microscopically homogeneous.

Gels may be again divided into elastic and nonelastic groups according to whether the gel will re-swell or not, after being dried, when placed in the original solvent. Examples of the elastic gel are gelatine and egg albumin, while examples of the nonelastic gel are silica and alumina gels.

The present invention applies to a new mode of removing the solvent from a gel, either elastic or nonelastic, in preparation for its use in the solid dried state, and the provision of a new class of products obtained thereby.

The most widely used of the inorganic aerogels is that of silica, so that I shall describe something of its properties and mode of production, with explanation of the properties as they are now understood. I shall also list some of its commercial uses in order to indicate what may be the uses of my product.

Most of the gel now commonly used commercially is made by mixing rapidly a solution of water glass with a solution of some suitable salt or acid, usually the latter, and allowing the mixture to stand until it becomes a stiff jelly. The jelly is then broken up, washed free of salts and allowed to dry slowly. It shrinks greatly in drying and when completely dry it is a hard glassy mass. A great number of variations have been tried in the conditions of precipitation and drying but the properties of the final product can be affected only to a very limited extent. These materials are designated in the art as xerogels and are characterized and distinguishable from my products in that they can be wetted with the same liquid menstruum as employed in their preparation, and subsequently dried by simple volatilization of the liquid without changing the physical characteristics of the product materially. Thus, ordinary silica gel (xerogel) can be immersed in water and subsequently dried at an elevated temperature and atmospheric pressure without changing materially its apparent density and other physical properties. On the other hand, an aerogel cannot be wetted and dried without loss of its characteristic properties. On the contrary, when an aerogel is wetted and dried the drying operation results in shrinkage and other changes incident to its conversion to an xerogel.

The best theoretical treatment sets forth that the jelly is a mass of interlacing fibres. Upon removal of the liquid by drying, the surface of the liquid in trying to withdraw within the mass of submicroscopic fibres forms concave menisci, just as it forms in a small tube, and tends to draw the fibrils with it so that there is not only a shrinkage of the water, or solvent volume, but shrinkage of the entire mass. This pull of the liquid surface on the fibrils can easily be understood when it is remembered that the smaller the tube the higher the water will rise in it by capillarity. The spaces between the fibrils are the counterparts of exceedingly minute tubules.

It is, therefore, clear that the gel will shrink until the fibrils are sufficiently compacted to withstand the compressive force due to the liquid surface. This force is very large, being of the order of thousands of pounds per square inch in easily imagined circumstances. With a substance as strong as silica, a point is reached where the shrinkage ceases and the water dries out, leaving a porous mass. Usually this mass contains from 30–50 per cent voids by volume. In the extreme case, that of a gel in which the drying was carried out with ferric oxide in the meshes, and later the ferric oxide was dissolved out, a very fragile product was obtained having approximately 75 per cent of its volume void.

The uses for silica gel in the dried condition depend upon the tendency of all molecules, either gaseous or in solution, to attach themselves to a surface. For a given volume of dried silica gel the internal surface is enormous so that easily condensed vapors show a very decided tendency to collect in the gel, and substances in solution can often be almost completely removed by the gel. In addition to the surface effect, there is the tendency for vapors to condense in fine capillaries much more readily than they condense in ordinary vessels.

These properties of the gel make it valuable for removing certain undesirable compounds from lubricating oils; for decolorizing sugar solutions during refining; for removal of vapors valuable or otherwise from gases such, for instance as the removal of benzene from coke oven gas; and for drying of air, since the gel will remove water almost completely from air and can then be reactivated by simply heating and driving off the water. Its power to absorb vapors has made it serviceable in automatic refrigerator cars where it is used instead of water to absorb ammonia, and in gas masks it could easily prove valuable for removal of toxis gases.

Another important use of silica gel is as carrier of contact catalysts. A contact catalyst is a substance that influences a chemical reaction at its surface without itself being consumed by the reaction. Since large surface is the principal requirement and since many contact catalysts are expensive, methods have been devised for coating the immense inner surface of silica gel with such catalysts, thus effecting considerable economies.

The primary object of the present invention therefore is to produce the gel by a method which will enable me at all times to have complete control thereof, whereby gels may be obtained with void space ranging all the way from the now usual 30-50 per cent found in all commercial gels, up to 99 per cent or higher. Another object of my invention is to provide a new class of gels—which are referred to herein as aerogels—and a method for their preparation, characterized in that they have inordinate adsorptive characteristics even as compared to the most porous active present day gels.

An additional object of my invention resides in producing a new class of colloidal products of an amorphous or essentially amorphous character, the degree of subdivision and special relationship of whose individual particles is the same as that in an undried gel or jelly or substantially of that order.

A further object is to produce the gels in an effective and economical manner.

The following examples illustrate embodiments of my invention:

*Example 1.*—I first form a hydrogel, such as silica hydrogel or jelly, in a suitable liquid medium, for example: water. For this purpose I may simply acidify water glass with sulfuric acid in the well known manner employed in manufacturing silica gel of commerce. The gel is then washed free of soluble substances. In certain cases the gel may be, if desired, partially dried before washing in order to strengthen the mass to stand the washing action or to permit advantageous handling of the same. After being washed the gel is placed in a strong autoclave. The autoclave is nearly filled with a liquid and then closed. The liquid used may be either the water usually used in the precipitating operation or a substituted liquid more suited from a mechanical standpoint to carrying out my method as will be pointed out later. The whole mass in the autoclave is then slowly heated. Due to the expansion of the liquid with temperature, the gas space in the autoclave may be completely filled by the liquid considerably before the critical temperature is reached. In such a case continued heating would tend to cause further expansion of the liquid and thereby subject the vessel to excessive pressures. It, therefore, becomes necessary to release some of the liquid through a suitable valve. In practice the pressure is preferably maintained at or slightly above the critical pressure of the liquid. The minimum quantity of liquid that is advisable to use in the pressure vessel is that quantity which, when expanded to completely fill the vessel, will have the critical density. If the gel present contains this limiting quantity of liquid it is not necessary to add more.

Heating is continued (only enough liquid being released to prevent excessive pressures, but not enough to produce substantial drying of the gel) until the temperature exceeds the critical temperature of the liquid in the pressure vessel. The gas is then released at a rate insufficient to damage the gel. The gel is left behind in a dried condition but having suffered little, if any, shrinkage.

If the gel is put into the vessel without added liquid, the liquid in the gel will expand with rising temperature more rapidly than evaporation into the closed space will occur, provided the total quantity of liquid present is equal to the minimum described above, and the gel will thereby not be subjected to compressive forces due to the capillarity.

The principle upon which my method works is as follows:

Above the critical temperature no gas can be liquefied, regardless of how great the pressure. If the gel is covered with liquid in the autoclave, there will be no liquid-gas surface coinciding with the gel surface, and therefore there can be no compression of the gel structure due to capillarity. As the temperature rises the liquid is never allowed to evaporate down to where the gel is exposed. Now as the critical temperature is passed, the liquid is transformed into a gas imperceptibly so that whereas only a fraction of a degree below that temperature one could say that the gel is filled with liquid, when that temperature is exceeded by only the slightest amount one must say that the gel is now filled with gas. If the pressure is maintained above the critical point, no surface can form and the gel has no way of "knowing" when the liquid that it held in its meshes has been converted to a gas. Slow removal of the gas, slow only to prevent the disruption of the gel, leaves the gel in the expanded condition but dry, having at no time in the process experienced forces that would tend to compress it.

Since the surface tension of a liquid decreases as the temperature rises, becoming zero at the critical temperature, it would be possible to obtain gels in a partially shrunken condition by allowing the liquid to slowly evaporate at some temperature below the critical temperature. The nearer to that temperature that evaporation was allowed to occur, the smaller force would the gel have to withstand and consequently the less compression would it experience. The most practical method of controlling the density, however, seems to be to allow evaporation to proceed at ordinary temperatures under controlled conditions until the gel has shrunk as much as is desired, and then to place it in the autoclave and remove the remainder of the liquid as described above.

As previously stated, most gels are primarily formed in water, but water has an inconveniently high critical temperature and the critical pressure is very high, which would require very strong apparatus, if the water was continued as the liquid in carrying out the method here disclosed. Furthermore, water exerts a very powerful solvent action as the temperature rises so that some gels, for example, that of silica, would dissolve before the critical temperature is reached. Silica is then precipitated as a very voluminous powder when the water is released above the critical temperature. This powder is of extremely fine texture and is valuable as a catalyst carrier in vanadium sulfuric acid catalysts. So far as I am aware, this material has never been manufactured heretofore. However, in order to obtain the aerogels, it is desirable and preferable, in my method, to substitute another liquid for the water. This is easily done by replacing the water in a gel with some liquid, such as an alcohol, that is very soluble or completely soluble in water. This liquid may then be replaced by other liquids miscible with it but insoluble in water.

In addition to the fact that my method enables one to obtain aerogels that could not have been prepared by known methods, it may be applied to partially shrunken gels. It therefore enables one to control completely the gel and obtain a product of just the desired density or porosity desired for a given purpose. The silica gel previously produced and which showed the maximum porosity so far obtained, possessed very little strength and has, therefore, not proved commercially practical. On the other hand, silica gel produced by my method and having the same apparent density, will have considerable strength and can be obtained in relatively large lumps or pieces which is not possible when made by present day methods.

As stated above, the only methods in existence prior to my invention for the control of the character of the final dried gel are crude in nature and ineffectual except over a limited range of properties. My invention enables complete control of the gel. The drying process may be stopped at any predetermined point and the liquid removed without further shrinkage of the gel skeleton. I have obtained silica gels with void space ranging all the way from the usual 30–50 per cent, found in the present commercial gels, up to 99 per cent, and I have certainly not reached the limit. If there were any reason for doing so, it is certain that I could obtain dry gels whose volume would be only 0.5 per cent silica.

My improved method is applicable to all gels, and numerous gels that have never been produced in the dried condition with appreciable free space within them can now be obtained in as voluminous condition as desired. For example, I have produced aerogels of cellulose, collodion, gelatine, albumin, alumina, nickel hydroxide, thoria, titania, stannic oxide, magnesium hydroxide, chromic oxide and others, and there is no reason to believe that the list cannot be extended almost indefinitely. The production of such gels as pyroxylin and cellulose in the distended condition offers a large field for investigation, and the probabilities are that such aerogels will prove valuable. Similarly, aerogels of compounds of iron, cobalt, zinc, cadmium, barium, manganese, vanadium, and copper may be prepared.

The aerogel seems to be particularly suited to the support of contact catalysts, especially for gaseous reactions, since gases can pass through the gels of low density with great facility and yet each molecule must come very close to a surface many, many times during the passage.

Many of the catalysts can themselves be produced in the form of gels and thus do away with the necessity of supporting on silica to give them large surfaces.

In gas masks the voluminous gel may be used as an ultra-filter for the removal of submicroscopic particles from the air. Toward the end of the last war the masks were useless in combating certain extremely fine powders and fogs that were used to produce sneezing.

When a nonelastic aerogel of low density, such as that of silica, is powdered, the product is of extreme fineness and is useful as a polishing abrasive. The voluminous gel is a very excellent heat insulator.

*Example 2.*—Dissolve 44 grams of magnesium nitrate $Mg(NO_3)_2.6H_2O$ in a small amount of glycerin and make up to a volume of 50 cc. Thereafter add 35 cc. of diethyl amine diluted with glycerin to 100 cc. in a manner whereby the diethylamine solution floats on top of the magnesium nitrate solution. Now shake the two layers vigorously for a few seconds and allow the resulting mixture to set to a firm jelly. To remove the glycerin the jelly is extracted with alcohol until the glycerin is completely removed. The alcohol is then extracted by means of ethyl ether until most of the alcohol is removed. The resulting ether gel is then placed in a pressure vessel with excess ether, if necessary, and the temperature raised to 195° C. while maintaining the pressure sufficiently high to prevent evaporation of the ether. After the temperature has reached the critical point the vapor is permitted to escape. The resulting gel is very light, coherent, though fragile, elastic and transparent or translucent.

*Example 3.*—Dissolve 83 grams of chromic nitrate $Cr(NO_3)_3.9H_2O$ in 100 cc. of water to which there is then added, while stirring vigorously, 35 grams of ammonium acetate dissolved in 50 cc. of water. After the mixture is uniform it is permitted to set. A jelly will form in about 5 minutes. To remove the soluble salts the gel is broken up and washed with water, after which the water is replaced by alcohol and the alcohol is replaced in part at least, by diethyl ether as described in Example 2. The ether-alcohol gel is then converted to the aerogel as described heretofore. The resulting product, when broken to pass a 10 mesh screen, has an apparent density of .25 gram per cc.

*Example 4.*—82 grams of stannic chloride $SnCl_4.5H_2O$ are dissolved in 200 grams of water and placed in a dialyzer, such as a sack made of regenerated cellulose as, for example, Cellophane, and is then suspended in 2500 cc. of distilled water. After about 24 hours the contents of the sack will have set to a firm jelly. This jelly is then washed with methyl alcohol until most of the water has been removed, after which it is converted to an aerogel by heating to 260° C. before the vapors are released. The aerogel is very light, colorless and transparent.

*Example 5.*—53 grams of a commercial grade of dry thorium nitrate is dissolved in 35 cc. of methyl alcohol. The solution is allowed to stand a few hours before further use. 10 parts by volume of the aforementioned solution is then thoroughly mixed with 10 parts by volume of redistilled aniline. Subsequently 1.8–2.0 parts by volume of water are added whereby the water floats on top of the mixture. The resulting mixture is shaken vigorously for 1 to 2 seconds, and finally permitted to stand. After a very short period of time it will set into a jelly which is broken up and covered with a mixture of 9 volumes of methyl alcohol and one volume of concentrated aqueous ammonia. This mixture is changed from time to time over a period of several days until practically all of the aniline has been leached out. Finally, it is washed with pure methyl alcohol or acetone or a mixture of these two, and autoclaved to form thorium oxide aerogel.

Example 6.—380 grams of aluminum nitrate $Al(NO_3)_3.9H_2O$ are first dissolved in 1200 cc. of methyl alcohol, cooled to about $-10°$ C. and stirred vigorously while adding 280 grams of redistilled aniline. The resulting mixture is allowed to attain room temperature at which time a firm jelly will have formed that can be extracted with methyl alcohol until free of aniline and salts. The alcohol-aluminum hydroxide jelly, or alcogel as it is referred to in the art, is then autoclaved to form an aerogel whereby an elastic, transparent product, having an apparent specific gravity of less than .1, which is relatively strong considering its low density, is obtained.

In the foregoing description and examples a number of solvents have been disclosed and a number of media having more or less favorable critical temperatures have been enumerated. It will be understood that these are exemplary only and that in addition to alcohol (ethyl alcohol), methyl alcohol, acetone, dimethyl ketone, diethyl ether, dimethyl ether, benzene and propane, many other liquids may be employed. Similarly, many other combinations may be employed with the view of obtaining the aerogel forming phenomenon under the most favorable temperature and pressure conditions.

It is to be understood that the particular method of preparing the hydrogel, alcogel, ether-gel or other gels, in addition to its conversion to the aerogel, forms no part of and does not limit the present invention.

Reference is herein made to the Miller and Connolly Patent No. 1,772,055, wherein a silica hydrogel is heated in the presence of liquid water for the purpose of effecting a hardening of the gel. However, in this process the final removal of water is effected by the more or less conventional means and the shrinking phenomena occasioned by the high surface tension of liquid water manifests itself. Accordingly, one obtains by this precedure a product which has an apparent specific gravity of as low as .5 but does not have the properties of aerogels. The Miller and Connolly product may be treated with water and dried, repeatedly, to obtain a somewhat similar product each time whereas my aerogel, when treated with water and subsequently dried, is converted to the xerogel having a substantially higher apparent specific gravity, otherwise lacking the characteristics of the aerogel and rather simulating the Miller and Connolly product so far as specific gravity is concerned. For example, if a silica aerogel with a specific gravity of .1 is wetted with water and subsequently dried, and the resulting dried product resembles Miller's product and has a specific gravity of approximately .6. I have not been able to produce an aerogel from a gel not previously dried that will not shrink in this manner when wetted and subsequently dried in the conventional manner.

Finally, it is to be noted that the Miller and Connolly process is not capable of producing a product having the low apparent specific gravities which I am able to obtain since the limiting factor of the surface tension of the water is not overcome by Miller and Connolly. Consequently, shrinking, which attends the removal of water by conventional means, manifests itself. In general, and in the absence of purposeful preliminary shrinkage, my aerogel products are characterized in part by the fact that their apparent specific gravity is not substantially greater than 15% of the actual specific gravity of the substance.

The aerogels are distinguishable from ordinary xerogels by their inordinate catalytic activity. For example, in the vapor phase oxidation of acetaldehyde to acetic acid, a silica aerogel performs more satisfactorily than the ordinary silica gel due in part to the fact that the aerogel does not become fouled as rapidly. In comparative tests the aerogel did not show any signs of fouling during the course of the runs while the ordinary gel turned yellow and showed resinous materials deposited thereon. Thoria aerogels convert carboxylic acids, as, for example, acetic acid, to ketones with practically quantitative yields at 300° C., while the best form of thoria that was obtained by heating the oxalate required a reaction temperature of at least 50° higher, the conversion was incomplete and side reactions resulted in the formation of byproducts. It is to be understood that for certain catalytic purposes it is desirable to have a mixed aerogel, that is, an aerogel containing more than one metallic component. These may be produced, preferably, by mixing the alcogels or ether gels before the autoclaving operation. The following example illustrates an alternative procedure for preparing one such mixed gel:

Example 7.—A silica hydrogel was soaked in a strong solution of aluminum sulphate for 24 hours, after which it was dropped into a concentrated ammonia solution. The resulting gel was washed with water to remove soluble salts, extracted with alcohol and autoclaved in the usual manner. This gel was found to be more active in the oxidation of acetaldehyde to acetic acid than either a silica aerogel or an alumina aerogel.

In addition to all of the foregoing characteristics which distinguish my aerogels from xerogels, the difference in thermal conductivity further emphasizes the fundamental difference between aerogels as a class and xerogels or products such as Miller and Connolly describe. To illustrate: silica aerogel, having an apparent specific gravity of .18, shows a heat conductivity lower than any solid which has ever been measured so far as I have been able to ascertain. Its heat conductivity at 34° C. is $$4.85 \times 10^{-5} \text{ cal./sec./°C./cm.}$$

This constant compares very favorably with some of the best known heat insulators of which the following are representative:

Cork _____ $10 \times 10^{-5}$
Asbestos _____ $22 \times 10^{-5}$
Best grade of mineral wool _____ $7.6 \times 10^{-5}$
Loose cellulose fibres _____ $8.4 \times 10^{-5}$ One of the advantages of the silica aerogel resides in its ability to withstand elevated temperatures of at least 800° C. indefinitely while other aerogels, such as alumina aerogels, will stand even higher temperatures. Ordinary silica gels (xerogels) are not much better than ordinary sand and possess no usefulness in the field of heat insulation.

Another feature of the aerogel products of the inorganic type resides in the fact that they do not pack or settle. It is well known that many finely divided materials tend to pack, leaving void spaces, and for this reason are not entirely satisfactory heat insulating media. Aerogels, on the other hand, show little or no such tendency. Moreover, while the materials are fragile, nevertheless they will support considerable weight, particularly when supported and in this respect are distinctly superior to materials such as mineral wool and asbestos which lose their valuable heat insulating properties as they are compressed or as they may settle. In other words, it is absolutely necessary, in order to preserve the heat insulating value of these materials, to preserve their fluffy nature.

Due to the porous nature of the aerogel much of the heat that is transferred passes through the gas phase. Accordingly, by substituting a gas of low thermal conductivity for air it is possible to improve the thermal resistance of the aerogels appreciably. For example, a gel that has a conductivity of 4.85 with air, has a conductivity of 4.33 when saturated with carbon dioxide and 3.71 when filled with dichlorodifluoromethane. Where the material is to serve as an insulator for refrigerator units and the like it is possible to lodge the insulator within a metal case which can be evacuated, the residual gas present being preferably one of low heat conductivity.

From the foregoing description it will be evident that I have provided a new class of products, aerogels, and various methods for their preparation. It will likewise be apparent that the gels are characterized by the fact that they are formed from colloidal solutions or gels in which the liquid menstruum is replaced by a gas such as air.

In my copending application referred to herein I have claimed aerogels generically and the tetravalent oxide forming elements of the fourth group of the periodic system, specifically. In this application I claim gels of compounds of other groups, particularly compounds of metal oxides and hydroxides and even salts which form gels, in all of which instances known methods of forming the initial hydro gel or alcogel may be used.

The organic aerogels share the dominating distinguishing characteristics of inorganic aerogels insofar as the characteristics depend upon the physical condition of the material. Thus, they have low thermal conductivity. They form hydrogels with water and corresponding gels with liquids in which they are not soluble, including mineral and vegetable oils, alcohols, etc.; in this capacity they serve as emulsifying agents and thickening agents suitable for use in the manufacture of food stuffs, medicinals, cosmetics, creams, etc.

One feature of the invention to which particular attention is drawn is the new class of products made possible by my method of washing gels whereby one liquid is substituted for another. Of these, an important class of products consists of the organic and particularly inorganic gels which have as their liquid phase water immiscible liquids and low melting solids notably oils such as petroleum oils, vegetable and animal oils or fats, including both the saturated and unsaturated types. These products are made by incorporating the finished aerogel with the particular water immiscible liquid while the latter is in liquid form. Usually some mixing or trituration is necessary to form a homogeneous colloidal gel. Another method for forming these products which may be used advantageously under some circumstances consists in displacing by working with oil an ether gel (or a gel embodying some other liquid which is miscible with the oil) or alternatively by applying heat to a mixture of the ether gel and the oil whereby the more volatile ether distills leaving a gel product consisting of the solid material and the oil. The foregoing materials are valuable for many purposes in the arts, thus the thickened oils are suitable for use in the lubricant, varnish and ink arts. The inorganic gels so formed have marked heat resistance whereas the organic type product is useful in food stuffs, cosmetics, creams and the like.

What I claim is:

1. A porous, substantially liquid-free gel having the cavities thereof filled with a gas, the volume of a unit of the gel being substantially that of the same unit when it is initially formed and still has the cavities thereof filled with liquid prior to drying, the gel being characterized by the fact that when it is re-wet with a liquid, and that liquid is evaporated at pressures substantially below the critical pressure, that material volume shrinkage of the gel structure occurs and further characterized in that the solid phase is a gel of a metal composition, the metal of which is selected from the group consisting of aluminum, chromium, nickel, iron, zinc, magnesium, cobalt, cadmium, barium, manganese, vanadium and copper.

2. A porous, substantially liquid-free gel having the cavities thereof filled with a gas and having an apparent specific gravity not substantially in excess of fifteen per cent. of the true specific gravity, the volume of a unit of the gel being substantially that of the same unit when it is initially formed and still has the cavities thereof filled with a liquid prior to drying, the gel being characterized by the fact that when it is re-wet with a liquid, and that liquid is evaporated at pressures substantially below the critical pressure, that material volume shrinkage of the gel structure occurs and further characterized in that the solid phase is a gel of a metal composition, the metal of which is selected from the group consisting of aluminum, chromium, nickel, iron, zinc, magnesium, cobalt, cadmium, barium, manganese, vanadium and copper.

3. A porous, substantially liquid-free gel having the cavities thereof filled with a gas, the volume of a unit of the gel being substantially that of the same unit when it is initially formed and still has the cavities thereof filled with liquid prior to drying, the gel being characterized by the fact that when it is re-wet with a liquid, and that liquid is evaporated at pressures substantially below the critical pressure, that material volume shrinkage by the gel structure occurs and further characterized in that the solid phase contains iron in chemically combined form.

4. A porous, substantially liquid-free gel having the cavities thereof filled with a gas, the volume of a unit of the gel being substantially that of the same unit when it is initially formed and still has the cavities thereof filled with liquid prior to drying, the gel being characterized by the fact that when it is re-wet with a liquid, and that liquid is evaporated at pressures substantially below the critical pressure, that material volume shrinkage by the gel structure occurs, and further characterized in that the solid phase contains chromium in chemically combined form.

5. A porous, substantially liquid-free gel having the cavities thereof filled with a gas, the volume of a unit of the gel being substantially that of the same unit when it is initially formed and still has the cavities thereof filled with liquid prior to drying, the gel being characterized by the fact that when it is re-wet with a liquid, and that liquid is evaporated at pressures substantially below the critical pressure, that material volume shrinkage by the gel structure occurs and further characterized in that the solid phase contains aluminum in chemically combined form.

SAMUEL S. KISTLER.